US005167252A

United States Patent [19]

Rogne

[11] Patent Number: 5,167,252

[45] Date of Patent: Dec. 1, 1992

[54] HIGH TEMPERATURE CONTROL DAMPER WITH SEALING FLANGE

[75] Inventor: Allan W. Rogne, Two Rivers, Wis.

[73] Assignee: W.R. Grace & Co.-Conn., New York, N.Y.

[21] Appl. No.: 647,223

[22] Filed: Jan. 29, 1991

[51] Int. Cl.[5] .................. F16K 1/22

[52] U.S. Cl. .................. 137/375; 137/601; 251/308

[58] Field of Search .................. 137/601, 375; 251/308

[56] References Cited

U.S. PATENT DOCUMENTS

| | | | |
|---|---|---|---|
| 2,106,093 | 1/1938 | Goese | 251/308 X |
| 2,846,999 | 8/1958 | Loewenheim | 126/292 |
| 2,988,083 | 6/1961 | Lowe | 126/285 |
| 3,525,328 | 8/1970 | Crudden | 137/601 X |
| 3,539,148 | 11/1970 | Boos | 251/308 X |
| 3,604,458 | 9/1971 | Silvey | 137/601 |
| 3,710,738 | 1/1973 | Franklin | 110/18 R |
| 3,972,348 | 8/1976 | Hagar | 137/601 |
| 4,022,246 | 5/1977 | Janse | 137/601 |
| 4,027,654 | 6/1977 | Kannapell | 126/285 R |
| 4,046,318 | 9/1977 | Ripley | 236/1 G |
| 4,177,716 | 12/1979 | Bowe et al. | 98/115 SB |
| 4,207,864 | 6/1980 | Fischer et al. | 126/285 R |
| 4,225,114 | 8/1980 | Barthelemy et al. | 251/308 |
| 4,249,571 | 2/1981 | McNabney | 137/601 |
| 4,262,652 | 4/1981 | Butzen | 126/285 B |
| 4,308,805 | 1/1982 | Spater | 110/163 |
| 4,390,123 | 6/1983 | McCabe | 236/16 |
| 4,484,562 | 11/1984 | Burt | 126/285 R |
| 4,503,755 | 3/1985 | Nordquist et al. | 251/308 X |
| 4,526,160 | 7/1985 | Ickes | 126/292 |
| 4,744,290 | 5/1988 | Josephson | 251/308 X |
| 4,823,836 | 4/1989 | Bachmann et al. | 137/601 |
| 4,932,437 | 6/1990 | Bachmann | 137/601 |
| 4,944,325 | 7/1990 | Baldwin et al. | 251/308 X |

*Primary Examiner*—Stephen M. Hepperle
*Attorney, Agent, or Firm*—Hugh D. Jaeger; Kevin S. Lemack; William L. Baker

[57] ABSTRACT

A high temperature control damper for use in an air flotation dryer with built-in afterburner or any other high temperature environment. Two damper blades are mounted between high temperature bearings and rotate in an insulated housing. The inner ends of the damper engage in a ship-lap joint, and the outer ends of the damper engage against sealing flanges.

5 Claims, 5 Drawing Sheets

HIGH TEMPERATURE CONTROL DAMPER WITH SEALING FLANGE

BACKGROUND OF THE INVENTION

1. Field of the Invention The present invention pertains to a control damper, and more particularly, to a high temperature control damper with a sealing flange such as for use in an Air Flotation dryer with built-in afterburner.

2. Description of the Prior Art Prior art damper devices experienced excessive hot air leakage from high temperature chambers due to poor sealing of damper plates with respect to each other, and also with the surrounding duct casing because of the thermal metal expansion.

Difficulties were also encountered where the integrity of the welds holding the damper blades to the corresponding drive shafts would be violated by rapidly changing temperatures occurring within and adjacent to the control damper environment.

The present invention overcomes the disadvantages of the prior art by providing a stainless steel control damper with thermal expansion compensation in the sealing devices and also by providing damper blades which are securely pinned to the slotted drive shafts.

SUMMARY OF THE INVENTION

The general purpose of the present invention is to provide a high temperature control damper such as for an air flotation dryer with built-in afterburner.

According to one embodiment of the present invention, there is provided a high temperature stainless steel control damper with shaft mounted damper blades aligned in an interior cavity of a rectangular housing. The damper blades are suspended between opposing rotatable shafts to control flow through the interior cavity. The damper blades seal against each other at and about a common ship-lap joint and against stainless steel sealing flanges about the interior cavity. One end of each damper blade pins securely to an end of a rotatable slotted shaft. The opposing ends of the damper blades secure as a slip joint in slots in the opposing rotatable slotted shaft ends, and are secured therein by pins through slotted holes in the rotatable slotted shafts to accommodate thermal expansion. The damper blades are connected by a linkage for control with respect to each other.

One significant aspect and feature of the present invention is a control damper for use in high temperature environments exceeding 1600° F. degrees.

Another significant aspect and feature of the present invention is an internal high temperature stainless steel sealing flange.

An additional significant aspect and feature of the present invention is damper blades which overlap in a ship-lap joint.

A further significant aspect and feature of the present invention is damper blades secured to shafts by pins.

Still another significant aspect and feature of the present invention is damper blades in sliding engagement with a shaft.

Having thus described one embodiment of the present invention, it is the principal object hereof to provide a control damper for use in high temperature environments.

One object of the present invention is a high temperature damper for use in an air flotation dryer with built-in afterburner.

BRIEF DESCRIPTION OF THE DRAWINGS

Other objects of the present invention and many of the attendant advantages of the present invention will be readily appreciated as the same becomes better understood by reference to the following detailed description when considered in connection with the accompanying drawings, in which like reference numerals designate like parts throughout the figures thereof and wherein.

DESCRIPTION OF THE PREFERRED EMBODIMENTS

Figure 1:
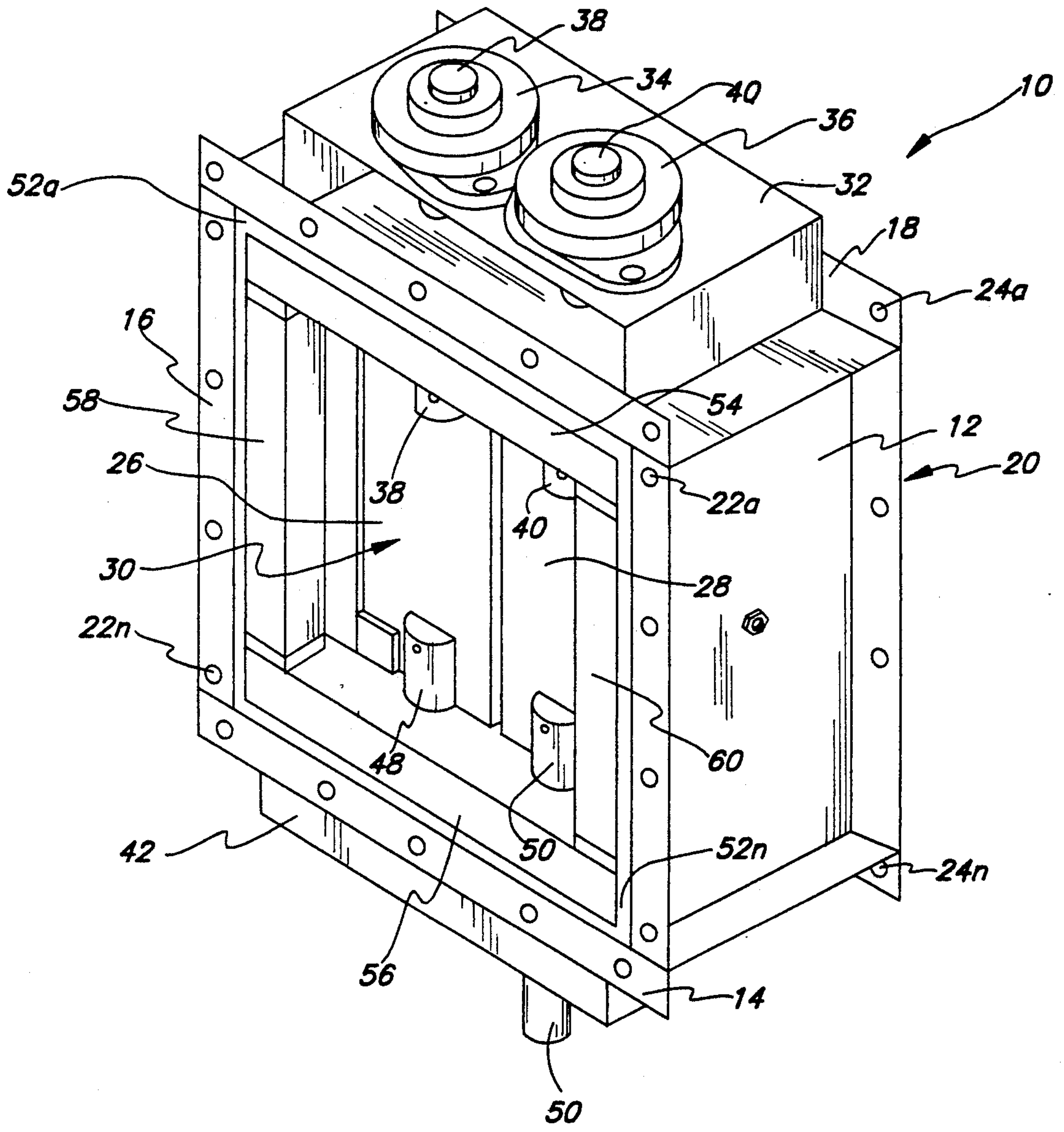
FIG. 1 illustrates a perspective view of a high temperature control damper, the present invention.
Figure 2:
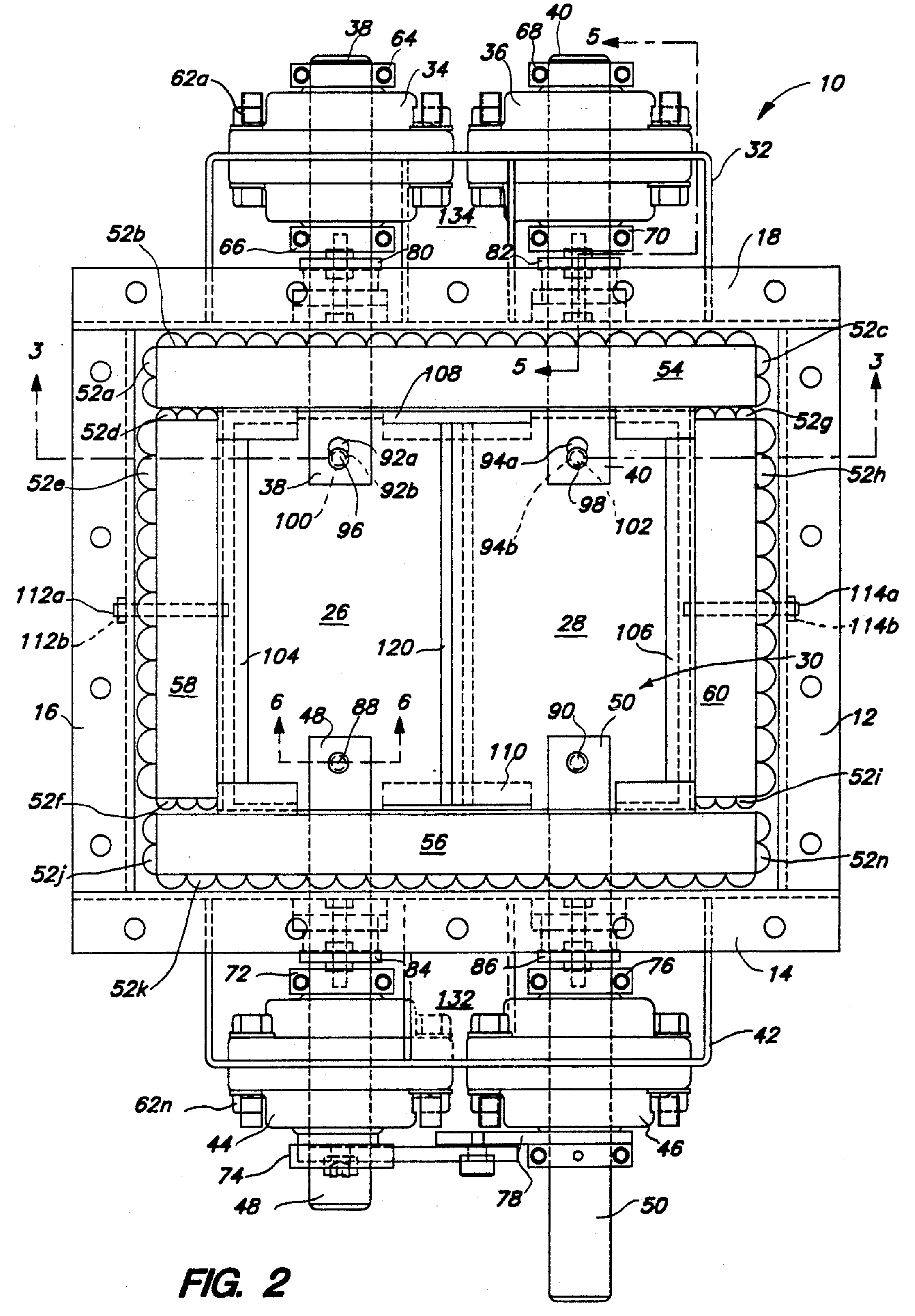
FIG. 2 illustrates a front view of the high temperature control damper.

FIG. 1 illustrates a perspective view of a high temperature control damper 10, the present invention, for use in a high temperature environment. Reference to FIG. 2, as well as the other FIGS., is useful in understanding the present invention. Stainless steel channel members 12, 14, 16 and 18 form a rectangle housing 20 for mounting of the components therein. The rectangular housing 20 also includes a plurality of holes **22*a*–22*n* and 24*a*–24*n* in the channel sides to facilitate mounting of the high temperature control damper 10 in a duct work system, such as an air flotation dryer with built-in afterburner. A pair of stainless steel damper blades 26 and 28 mount centrally, and are suspended within the interior of the rectangular housing 20 to control the flow of hot air through the interior cavity 30 bounded by the channels 12–18. An upper bracket 32 secures on the channel member 18. High temperature bearings 34 and 36 secure to the upper bracket 32. Stainless steel stub shafts 38 and 40 align in the high temperature bearings 34 and 36, respectively, and extend through the channel member 18. The upper edge of damper blade 26 secures to the lower end of the stub shaft 38, and the upper edge of the damper blade 28 secures to the lower end of the stub shaft 40 as later described in detail. The lower edges of the damper blades 26 and 28 secure in a similar fashion. A lower bracket 42 secures to the channel member 14. High temperature bearings 44 and 46 secure to the lower bracket 42 as illustrated in FIG. 2. The stainless steel stub shaft 48 and a stainless steel stub shaft 50 extend through the channel member 14 to align in the high temperature bearings 44 and 46. The lower edge of the damper blade 26 secures to the upper end of the stainless steel stub shaft 48, and the upper edge of the damper blade 28 secures to the upper end of the stainless steel stub shaft 50 as later described in detail. Fiber insulation blanket material 52*a*–52*n* lines the interior walls of the rectangular housing 20 as later described in detail. Horizontally aligned upper and lower ceramic fiber insulation boards 54 and 56 and vertically aligned left and right ceramic insulation boards 58** and 60, respectively, align inwardly from the fiber insulation blanket material 52a–52n. The fiber insulation blanket material 52a–52n and the ceramic fiber insulation boards 54–60 extend from the front side to the back side.

FIG. 2 illustrates a front view of the high temperature control damper 10 where all numerals correspond to those elements previously described. High temperature bearings 34, 36, 44 and 46 secure to the upper bracket 32 and lower bracket 42, respectively, with a plurality of nut and bolt hardware 62a–62n. Stub shafts 38 and 40 secure within the high temperature bearings 34 and 36 by collar clamps 64, 66, 68 and 70. The stub shaft 48 secures within the high temperature bearing 44 by a collar clamp 72 and a link arm assembly 74. The stub shaft 50 secures within the high temperature bearing 46 by a collar clamp 76 and a link arm assembly 78. The stub shafts 38, 40, 48 and 50 each pass through respective packing glands 80, 82, 84 and 86, respective channel members 18 and 14, respective fiber insulation blankets 52b and 52k, and respective ceramic fiber insulation boards 54 and 56. The stub shafts 38, 40, 48 and 50 are slotted at their inboard ends to accommodate their respective damper blades 26 and 28. Pins 88 and 90 pass through both sides of the slotted inboard ends of the shafts 48 and 50, and through the lower ends of the damper blades 26 and 28 to secure the respective members to each other in a stationary fashion. The upper ends of the damper blades 26 and 28 are secure in a similar manner. Stub shafts 38 and 40 feature slotted holes 92a, 92b and 94a and 94b common to the shafts 92 and 94. Pin 96 passes through the slotted hole 92a and 92b of the stub shaft 38 and also through a hole 100 in the upper end of the damper blade 26. Pin 98 passes through the slotted hole 94a and 94b of the stub shaft 40 and also through a hole 102 in the upper end of the damper blade 28. The damper blades 26 and 28 heat and expand during damper operation. The upper end position of the damper blades 26 and 28 move within and are slidingly engaged by the slotted ends of the stub shafts 38 and 40. The pins 96 and 98 are allowed to ride in a nonbinding manner in the slotted holes 92a–92b and 94a–94b, respectively, as the length of the damper blades 26 and 28 vary according to the temperature of the air passing through the high temperature control damper 10. Support for the upper ends of the damper blades 26 and 28 is maintained by the slotted end, and the pin arrangement securing the damper blades 26 and 28 to their respective stub shafts 38 and 40. A cross-sectional view of the stub shaft 38 is provided in FIG. 6. A U-shaped high temperature stainless steel sealing flange 104 with right angled ends secures between the ceramic fiber insulation boards 54 and 56 and adjacent to the ceramic fiber insulation board 58. A corresponding and opposing U-shaped high temperature stainless steel sealing flange 106 with right angled ends secures between the ceramic fiber insulation board 54 and 56 and adjacent to the ceramic fiber insulation board 60. Another high temperature stainless steel sealing flange 108 secures to the ceramic fiber insulation board 54, and a high temperature stainless steel sealing flange 110 secures to the ceramic fiber insulation board 56. The damper blades 26 and 28 are rotationally positioned against the sealing flanges 104–110. Stub shaft 50 is rotatable to position the damper blade 28. Link arm assemblies 74 and 78 cause the stub shaft 48 to be counter rotated to position the damper blade 26. The damper blades 26 and 28 are moved in unison by predetermined proportional amounts to provide air to flow between the inner edges of the damper blades 26 and 28 and around the outer edges of the damper plates 26 and 28, and the area between the outer edges of the damper plates 26 and 28 and the ceramic fiber insulation board 58 and 60. The damper blades 26 and 28 seal against the sealing flanges 104–110 when desired by rotation of the stub shaft 50. The inner edges of damper blades 26 and 28 have a ship-lap sealing joint for thermal expansion compensation. This ship-lap seal is illustrated and described in FIG. 3. Bolts 112a–112b and 114a–114b secure the ceramic fiber insulation board 58 and 60, respectively, to channel members 12 and 16.

Figure 3:
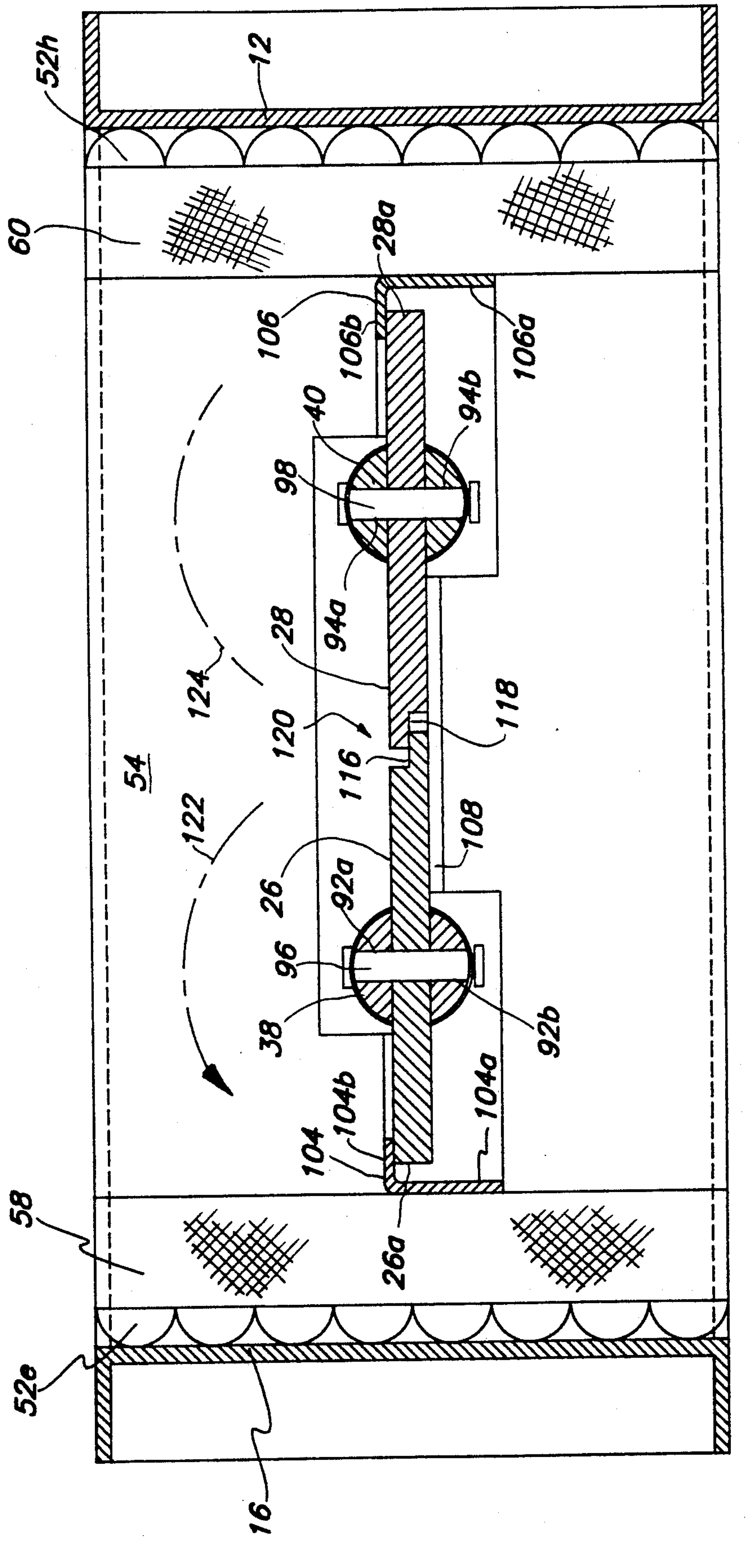
FIG. 3 illustrates a cross-sectional view along line 3—3 of FIG. 2.

FIG. 3 illustrates a cross-sectional view along line 3—3 of FIG. 2 where all numerals correspond to those elements previously described. Particularly illustrated are the damper blades 26 and 28 against the sealing flanges 104, 106 and 108. Damper blades 26 and 28 have dados 116 and 118 which form a ship-lap joint 120. As the temperature of the damper blades 26 and 28 changes upwardly or downwardly, the width of the damper blades 26 and 28 increase or decrease accordingly. A slip seal at the ship-lap joint 120 is maintained due to the fact that the dado surfaces 116 and 118 slide horizontally and still maintain contact throughout thermal expansion. The outboard ends 26a and 28a of the damper blades 26 and 28 are of proper length and spacing with respect to the vertical portions 104a and 106a to maintain a good seal with the horizontal portions 104b and 106b of the sealing flanges 104 and 106 during thermal activity. Direction of rotation of the damper blades 26 and 28 are indicated by arrows 122 and 124.

Figure 4:
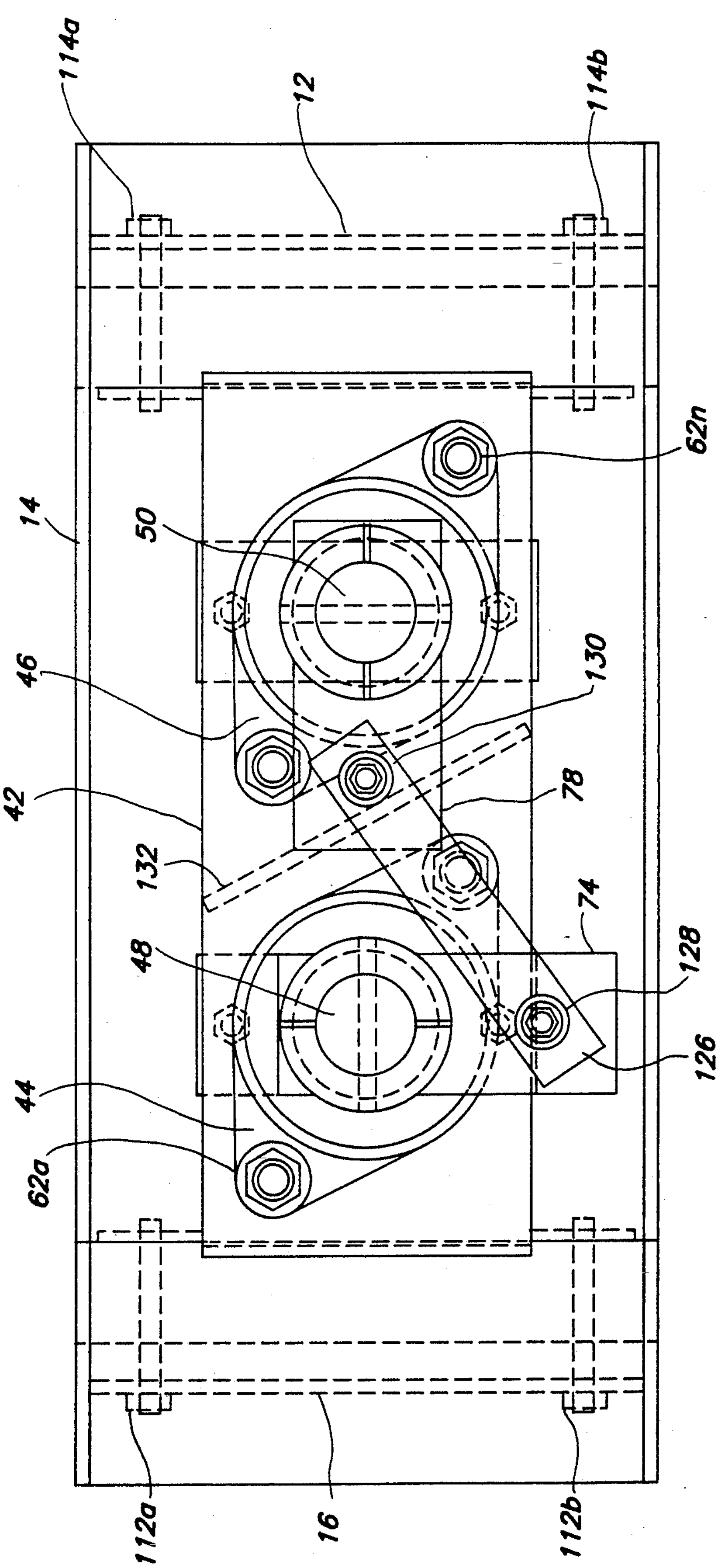
FIG. 4 illustrates a bottom view of the high temperature control damper.

FIG. 4 illustrates a bottom view of the high temperature control damper 10 where all numerals correspond to those elements previously described. Illustrated in particular is the linkage between the stub shafts 48 and 50. A linkage bar 126 secures to link arm assemblies 74 and 78 of stub shafts 48 and 50, respectively, with fasteners 128 and 130. When the stub shaft 50 is rotated, stub shaft 48 is counter rotated via the link arm assembly 78, linkage bar 126 and link arm assembly 74 to position the damper blades as previously described. A support 132 for the lower bracket 42 is illustrated beneath the lower bracket 42. A corresponding support 134 is also illustrated in FIG. 2.

Figure 5:
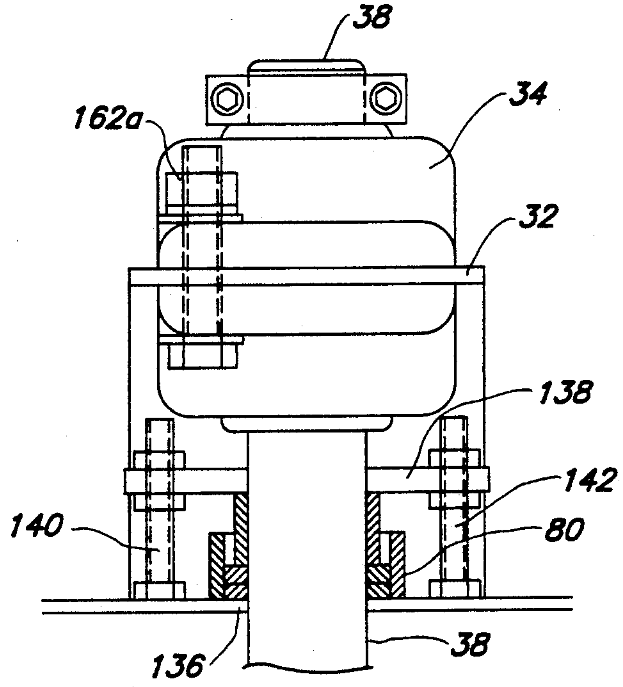
FIG. 5 illustrates a view of a high temperature bearing and packing gland.

FIG. 5 illustrates a view of a high temperature bearing 340 and high temperature packing gland 86 along line 5—5 of FIG. 2 where all numerals correspond to those elements previously described. High temperature fiber wicking 136 is held in place by a follower plate assembly 138. Studs 140 and 142 secure the follower plate assembly 138 to the channel member 18.

Figure 6:
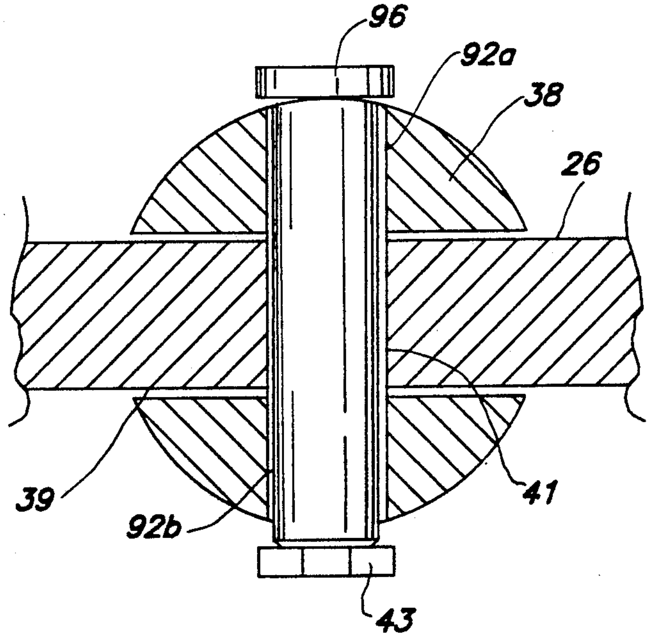
FIG. 6 illustrates a cross-sectional view of a slotted stub shaft along line 6—6 of FIG. 2.

FIG. 6 illustrates a cross-sectional view of the slotted stub shaft 38 along line 6—6 of FIG. 2 where all numerals correspond to those elements previously described. Slot 39 aligns with a diameter of the stub shaft 38, and is dimensioned to compensate for heat expansion of the damper blade 26 and the stub shaft 38, to preclude binding between the damper blade 26 and the stub shaft 38. The pin 96 extends through slotted hole 92a, hole 41 in the damper blade 26, and hole 92b and is secured thereto by a fastener 43 in the end of the pin 96. The slotted holes 92a, 92b and 41 are also dimensioned to compensate for heat expansion of the damper blade 26, the stub shaft 38 and the pin 96. Exaggerated spacings between the members of FIG. 6 are illustrated for purposes of clarity. Pin 98 affixes the damper blade 28 to the stub shaft 40 in a like and similar manner.

MODE OF OPERATION

The damper blades 26 and 28 rotate in high temperature bearings 34, 36, 44 and 46 as illustrated in FIG. 1 about axis to engage the inner ends in a ship-lap joint 120 configuration as illustrated in FIG. 3. The damper blades are pinned to their respective shafts to provide mechanical integrity. Sealing flanges 104 and 106 engage the outer ends of the dampers. The damper blades are particularly suited for use in an air flotation dryer with built-in afterburner.

Various modifications can be made to the present invention without departing from the apparent scope hereof.

I claim:

1. High temperature control damper comprising:

a. a housing including insulation means about said housing;

b. spaced opposing high temperature bearing means secured to said housing;

c. first and second slotted shafts extending between said bearings;

d. a damper secured stationary in said slot of said first shaft, and floatingly secured in said slot of said second shaft;

e. sealing means between inner ends of said damper and outer ends of said damper and said housing; and, f. linkage mans connected to at least one of said shafts for rotation of said damper.

2. High temperature control damper comprising:

a. a housing;

b. first and second spaced opposing high temperature bearing means c. a first shaft rotatingly held in said first bearing means;

d. a second shaft rotatingly held in said second bearing means;

e. first means in said first shaft to fixingly engage a damper;

f. second means in said second shaft to slidingly engage said damper;

g. sealing means between inner ends of said damper and outer ends of said damper and said housing;

h. means connected to at least one of said shafts for rotation of said damper.

3. The high temperature control damper of claim 2 wherein said second means to slidingly engage said damper comprises a slot in said second shaft.

4. High temperature control damper comprising:

a. a housing including insulation means about said housing;

b. a pair of spaced opposing high temperature bearing means secured to said housing;

c. a pair of upper shafts and a pair of lower shafts extending between said bearings;

d. a pair of dampers, each fixedly mounted to a lower shaft and slidingly mounted to an upper shaft;

e. sealing means between inner ends of said dampers and outer ends of said dampers and said housing; and f. linkage means connected to said shafts for rotation of said dampers.

5. The high temperature control damper of claim 4, wherein said sealing means at outer ends of said dampers comprises a ship-lap joint.

* * * * *